United States Patent
Van Fossen

(10) Patent No.: US 12,254,757 B1
(45) Date of Patent: Mar. 18, 2025

(54) SYSTEM AND METHOD FOR OPTIMIZED WORKPLACE SAFETY

(71) Applicant: Worksafe Mapping, LLC, Apollo Beach, FL (US)

(72) Inventor: Peter A. Van Fossen, Apollo Beach, FL (US)

(73) Assignee: Worksafe Mapping, LLC, Apollo Beach, FL (US)

(*) Notice: Subject to any disclaimer, the term of this patent is extended or adjusted under 35 U.S.C. 154(b) by 0 days.

(21) Appl. No.: 18/664,914

(22) Filed: May 15, 2024

Related U.S. Application Data

(60) Provisional application No. 63/508,113, filed on Jun. 14, 2023.

(51) Int. Cl.
| | |
|---|---|
| *G08B 21/22* | (2006.01) |
| *G08B 7/06* | (2006.01) |
| *G08B 21/02* | (2006.01) |
| *H04W 4/02* | (2018.01) |
| *H04W 4/021* | (2018.01) |
| *H04W 4/90* | (2018.01) |

(52) U.S. Cl.
CPC ............ *G08B 21/22* (2013.01); *G08B 7/06* (2013.01); *G08B 21/02* (2013.01); *H04W 4/021* (2013.01); *H04W 4/025* (2013.01); *H04W 4/90* (2018.02)

(58) Field of Classification Search
CPC .......... G08B 21/22; G08B 7/06; G08B 21/02; H04W 4/021; H04W 4/025; H04W 4/90
See application file for complete search history.

(56) References Cited

U.S. PATENT DOCUMENTS

| | | |
|---|---|---|
| 10,055,985 B1 | 8/2018 | Hayward |
| 2020/0168080 A1 | 5/2020 | Kim et al. |
| 2020/0409377 A1 | 12/2020 | Ready-Campbell et al. |
| 2022/0348227 A1 | 11/2022 | Foster et al. |
| 2023/0315121 A1* | 10/2023 | Ito .......................... G05D 1/247 701/23 |

* cited by examiner

*Primary Examiner* — Daryl C Pope
(74) *Attorney, Agent, or Firm* — Owen G. Behrens; Smith & Hopen, P.A.

(57) ABSTRACT

Described herein relates to a system and method for system of and method for optimizing real-time workplace safety monitoring by facilitating hazard avoidance within an industrial environment. In an embodiment, the global access protection (hereinafter "GAP") system may comprise a computing device comprising at least one processor, such that the computing device may be communicatively coupled to at least one Global Positioning System (hereinafter "GPS") system. Additionally, in this embodiment, the computing device may be integrated within the at least one beacon and/or the at least one receiver. In this manner, the at least one beacon and/or at least one receiver may be configured to output and/or input a GPS, RTK GPS, and/or any positioning system known in the art, such that the GAP system may be configured to determine a distance between the at least one beacon and the at least one receiver within the industrial environment.

16 Claims, 18 Drawing Sheets

*FIG. 9A*

SYSTEM AND METHOD FOR OPTIMIZED WORKPLACE SAFETY

CROSS-REFERENCE TO RELATED APPLICATIONS

This nonprovisional patent application claims priority to U.S. Provisional Patent Application No. 63/508,113 entitled "GLOBAL ACCESS PROTECTION SYSTEM" filed Jun. 14, 2023 by the same inventor, all of which is incorporated herein by reference, in its entirety, for all purposes.

BACKGROUND OF THE INVENTION

1. Field of the Invention

This invention relates, generally, to safety-monitoring. More specifically, it relates to a system of and method for real-time workplace safety monitoring by facilitating hazard avoidance within an industrial environment.

2. Brief Description of the Prior Art

Generally, a construction site is an extremely hazardous area, a plurality of workers from various fields are often dispatched on the site and perform a variety of work in a construction site. As such, safety accidents also occur quite frequently, leading to an increased need for appropriate and real-time safety management for the plurality of workers. However, since only a very small number of managers are stationed on the construction site to manage the workers, there a limited ability to correctly grasp all the working situations occurring in the construction site and prevent any safety accidents in advance. This is further exacerbated by the use of heavy equipment at large construction sites.

Warning systems to prevent collisions between vehicles and/or pedestrians have been used for decades, and can be found in various forms. For example, the most commonly known warning system is a crossing gate with audible and/or visible warning signals. However, these audible and/or visible blasts, are not practical on a variable sized construction site. A worker stationed within heavy equipment may not hear the warning due to the average noise pollution of not only the construction site, but also within the operating vehicle. As such, it is not practical to use signs or standard warning systems to inform and/or warn workers within heavy machinery of an approaching pedestrian and/or hazard.

Accordingly, what is needed is a safe, effective, and efficient system of and method of real-time workplace safety monitoring within an industrial environment. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a method of optimizing real-time workplace safety monitoring within at least one industrial environment. In an embodiment, the method may comprise the following steps: (a) marking, via the at least one processor of a computing device, at least one of a plurality of geofences of at least one hazard within the at least one industrial environment; (b) determining, via a GPS communication system communicatively coupled to the at least one processor of the computing device, a location of the computing device; (c) comparing, via the GPS communication system communicatively coupled to the at least one processor of the computing device, the location of the at least one boundary of the at least one hazard and the at least one computing device; and (d) automatically facilitating, via the at least one processor of the computing device, hazard avoidance by: (i) based on a determination that at least one portion of the at least one boundary of the at least one hazard and at least one portion of the computing device intersect, transmitting a notification indicative of the intersection, inhibiting access to at least one of a plurality of applications of the computing device until the location of the computing device does not intersect with any portion of the at least one geofence of the hazard, or both; and (ii) based on a determination that at least one portion of the at least one boundary of the at least one hazard and at least one portion of the computing device do not intersect, maintaining standard operation of the computing device.

In some embodiments, the method may further comprise the following step of, recording, via the at least one processor of the computing device, in a memory of the computing device and/or at least one external server of at least one service provider. In these other embodiments, the step of automatically facilitating hazard avoidance may further comprise the step of, based on a determination that at least one portion of the at least one boundary of the at least one hazard and at least one portion of the computing device intersect, directing, via the processor of the at least one computing device, to an emergency alert page of at least one service provider. In this manner, the emergency alert page may comprise a plurality of real-time notifications. As such, the plurality of real-time notifications may be selected form a group consisting of a status update of the risk level associated with the at least one hazard, a real-time timeline associated with the at least one hazard, a timestamp for a removal of the at least one hazard, an all-clear status associated with the at least one hazard, and/or a combination of thereof.

In some embodiments, the method may further comprise the following step of, mapping, via a Map profile communicatively coupled to the at least one processor of the computing device, a real-time geographical location of the at least one hazard within the at least one industrial environment on a display device associated with the computing device. In these other embodiments, the step of mapping a real-time geographical location of the at least one hazard within the at least one industrial environment may also comprise the step of, mapping, via the GPS communication system communicatively coupled to the at least one processor of the computing device, a geographical location of the computing device on the display device associated with the computing device. Additionally, the step of, mapping, via the GPS communication system communicatively coupled to the at least one processor of the computing device, a geographical location of the computing device may further comprise the step of, outputting, via the at least one processor of the computing device, a plurality of notifications indicative of a physical distance between the computing device and at least one of the plurality of geofences on the display device associated with the computing device. As such, in these other embodiments, the step of, outputting a plurality of notifications indicative of a physical distance between the computing device and at least one of the plurality of geofences on the display device associated with the computing device may further comprise the step of, adjusting, via the processor of the computing device, an electric current supplied to the a haptic motor associated with the computing device in response to changes in the physical distance between the real-time geographical location of the at least one hazard and the real-time geographical location of the computing device.

In some embodiments, the method may further comprise the following step of generating, via the at least one processor of the computing device, a danger zone profile, wherein the danger zone profile comprises a plurality of details associated with the at least one recorded marked hazard within the at least one industrial environment. In these other embodiments, the plurality of details associated with the at least one marked hazard may be selected from a group consisting of, an address and/or location of the at least one marked hazard and/or industrial environment, an asset type, the at least one geofence associated with the at least one marked hazard, a corporate department associated with the at least one industrial environment, a date of the marked hazard, a model of the asset type, an elevation of the at least one industrial environment, a level of risk associated with the at least one marked hazard, a weather condition, a plurality of photos, any required documentation associated with the at least one marked hazard and/or industrial environment, and/or a combination of thereof.

Another aspect of the present disclosure pertains to a workplace safety optimization system. In an embodiment, the workplace safety optimization system may comprise the following: (a) a computing device comprising at least one processor; and (b) a non-transitory computer-readable medium operable coupled to the at least one processor, the compute-readable medium having computer-readable instructions stored theorem that, when executed by the at least one processor, may cause the workplace safety optimization system to automatically facilitate hazard avoidance by executing instructions comprising: (i) marking, via the at least one processor of the computing device, at least one of a plurality of geofences of at least one hazard within the at least one industrial environment; (ii) determining, via a GPS communication system communicatively coupled to the at least one processor of the computing device, a location of the computing device; (iii) comparing, via the GPS communication system communicatively coupled to the at least one processor of the computing device, the location of the at least one boundary of the at least one hazard and the at least one computing device; and (iv) automatically facilitating, via the at least one processor of the computing device, hazard avoidance by: (A) based on a determination that at least one portion of the at least one boundary of the at least one hazard and at least one portion of the computing device intersect, transmitting a notification indicative of the intersection, inhibiting access to at least one of a plurality of applications of the computing device until the location of the computing device does not intersect with any portion of the at least one geofence of the hazard, or both; and (B) based on a determination that at least one portion of the at least one boundary of the at least one hazard and at least one portion of the computing device do not intersect, maintaining standard operation of the computing device.

In some embodiments, the executed instructions may further comprise the step of, recording, via the at least one processor of the computing device, in a memory of the computing device and/or at least one external server of at least one service provider. In these other embodiments, the step of automatically facilitating hazard avoidance of the executed instructions may also comprise the step of, based on a determination that at least one portion of the at least one boundary of the at least one hazard and at least one portion of the computing device intersect, directing, via the processor of the at least one computing device, to an emergency alert page of at least one service provider. In this manner, the emergency alert page may comprise a plurality of real-time notifications. As such, the plurality of real-time notifications may be selected form a group consisting of a status update of the risk level associated with the at least one hazard, a real-time timeline associated with the at least one hazard, a timestamp for a removal of the at least one hazard, an all-clear status associated with the at least one hazard, and/or a combination of thereof.

In some embodiments, the executed instructions may further comprise the step of, mapping, via a Map profile communicatively coupled to the at least one processor of the computing device, a real-time geographical location of the at least one hazard within the at least one industrial environment on a display device associated with the computing device. In addition, in these other embodiments, the step of mapping a real-time geographical location of the at least one hazard within the at least one industrial environment of the executed instructions may also comprise the step of, mapping, via the GPS communication system communicatively coupled to the at least one processor of the computing device, a geographical location of the computing device on the display device associated with the computing device.

In some embodiments, the executed instructions may further comprise the step of generating, via the at least one processor of the computing device, a danger zone profile, wherein the danger zone profile comprises a plurality of details associated with the at least one recorded marked hazard within the at least one industrial environment. As such, in these other embodiments, the plurality of details associated with the at least one marked hazard may be selected from a group consisting of, an address and/or location of the at least one marked hazard and/or industrial environment, an asset type, the at least one geofence associated with the at least one marked hazard, a corporate department associated with the at least one industrial environment, a date of the marked hazard, a model of the asset type, an elevation of the at least one industrial environment, a level of risk associated with the at least one marked hazard, a weather condition, a plurality of photos, any required documentation associated with the at least one marked hazard and/or industrial environment, and/or a combination of thereof.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 9A is a graphical illustration of a danger zone selection module of a danger zone profile of a global access protection system, according to an embodiment of the present disclosure.

DETAILED DESCRIPTION OF THE INVENTION

Figure 1:
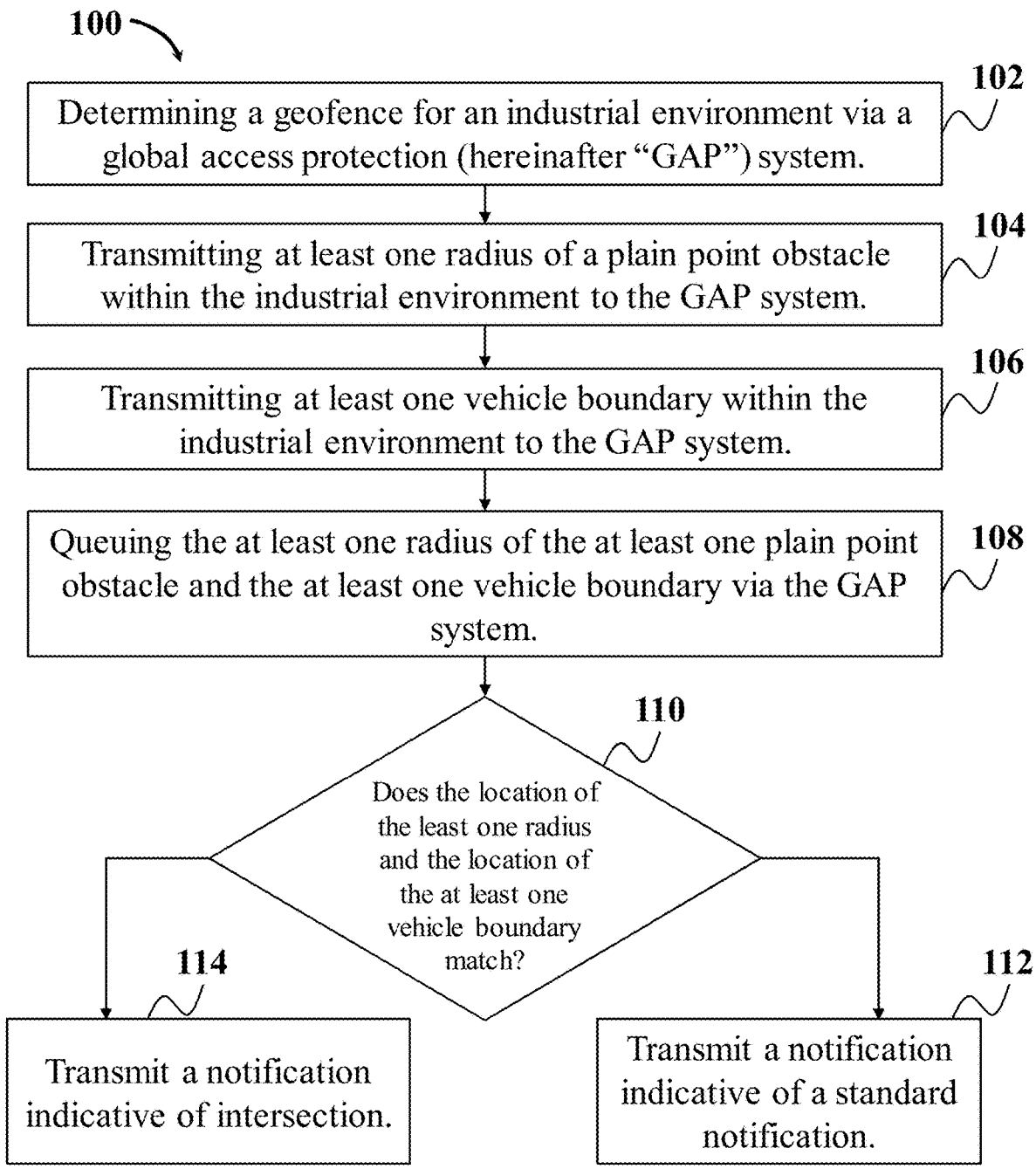
FIG. 1 is a process-flow diagram providing a first exemplary method of automatically monitoring a worksite within an industrial environment, in real-time, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a computer readable medium described below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, Flutter, Noid, Dart, Node.js, MATLAB, and/or the like and/or conventional procedural programming languages, such as the "C" programming language and/or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term "industrial environment" refers to any area known in the art in which a user may be exposed to harsh physical and/or mental conditions. Non-limiting examples of an industrial environment may include a port, a refinery, a construction site, a chemical plant, a factory, a warehouse, a plant, a manufacturing facility, a fabrication facility, a dig site, and/or a mill. For ease of reference, the exemplary embodiment, described herein, refers to a construction site and/or a dig site, but this description should not be interpreted as exclusionary to other areas comprising harsh physical and/or mental conditions.

As used herein, the term "vehicle" refers to any industrial mechanism and/or equipment known in the art which may be used within an industrial environment. Non-limiting examples of the vehicle may include an excavator, a dump truck, a bulldozer, a crane, a steam roller, and/or a semi-truck. For ease of reference, the exemplary embodiment described herein refers to a dump truck and/or a semi-truck, but this description should not be interpreted as exclusionary of other industrial mechanisms.

As used herein, the term "hazard" refers to any condition known in the art that may cause injury and/or death to an individual and/or loss of product and/or property. Non-limiting examples of a hazard may include chemicals and/or biologics that cause acute and/or long-term detrimental health effects (e.g., neurotoxins, immune agents, dermatologic agents, carcinogens, sensitizers, bacteria, fungi, and/or viruses), individual worksite members, heat and/or cold stress, vibration, noise, loss of cellular communication, a weather event (e.g., tornado, hurricane, and/or flood), and/or roadway issue (e.g., car crash, pothole, and/or car on fire). For ease of reference, the exemplary embodiment described herein refers to chemicals and/or biologics, weather events, loss of cellular communication and/or roadway issues, but this description should not be interpreted as exclusionary of other conditions that may cause injury and/or death to the individual and/or loss of product and/or property.

As used herein, the term "plain-point obstacle" refers to any hazard in an industrial environment known in the art which may be plotted as a singular point. Non-limiting examples of a plain point obstacle may include a user, a crane, scaffolding, an industrial vehicle, a container, and/or a RTS beacon. For ease of reference, the exemplary embodiment, described herein, refers to a user, a vehicle, and/or an RTS beacon but this description should not be interpreted as exclusionary to other industrial environment hazards.

As used herein, the term "multi-point obstacle" refers to any hazard in an industrial environment known in the art which may be plotted with a plurality of waypoints. Non-limiting examples of a plain point obstacle may include scaffolding, a hole, a ramp, a container, a rebar, a steel beam, machinery, an excavator, and/or mining sifting equipment. For ease of reference, the exemplary embodiment, described herein, refers to scaffolding, a hole, and/or a ramp but this description should not be interpreted as exclusionary to other industrial environment hazards.

As used herein, the term "communicatively coupled" refers to any coupling mechanism known in the art, such that at least one electrical signal may be transmitted between one device and one alternative device. Non-limiting examples of communicatively coupled may include to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, The term "about", "approximately", or "roughly" as used herein refers to being within an acceptable error range for the particular value as determined by one of ordinary skill in the art, which will depend in part on how the value is measured or determined (e.g., the limitations of the measurement system) (e.g., the degree of precision required for a particular purpose, such as automatically monitoring, in real-time, at least one hazard within an industrial environment). As used herein "about" refers to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Global Access Protection System

The present disclosure pertains to a system and method of real-time workplace safety monitoring by facilitating hazard avoidance within an industrial environment. In an embodiment, the global access protection (hereinafter "GAP") system may be communicatively coupled to a computing device (e.g., a mobile computing device) comprising at least one processor and/or at least one external computing device (e.g., an alternative mobile computing device) comprising at least one processor, such that the computing device and/or the at least one external computing device may be communicatively coupled to at least one Global Positioning System (hereinafter "GPS") system. Additionally, in this embodiment, the GAP system may comprise at least one receiver and/or at least one beacon communicatively coupled to the computing device and/or the at least one external computing device, such that the at least one beacon may be configured to transmit at least one electrical signal to the computing device and/or the at least one receiver, and/or vice versa.

Additionally, in an embodiment, the computing device and/or the at least one external computing device communicatively coupled to the GAP system may be integrated within the at least one beacon and/or the at least one receiver. In this manner, the at least one beacon and/or at least one receiver may be configured to output and/or input a GPS, RTK GPS, and/or any positioning system known in the art. For ease of reference, the exemplary embodiment, described herein, refers to RTK GPS, however, this description should not be interpreted as exclusionary to other positioning systems. For example, in some embodiments, the at least one beacon may be stationary and/or the at least one receiver may be mobile, such that the GAP system may be configured to determine a distance between the at least one beacon and the at least one receiver within the industrial environment.

Moreover, in an embodiment, GAP system may be configured to be transported and/or disposed about any industrial environment, known in the art. As such, the at least one beacon may be made of a lightweight material, such that only one user may be required to transport the at least one beacon from the industrial environment to at least one alternative industrial environment. In this manner, in this example, the at least one anchor may be configured to be temporarily affixed to at least one console of an industrial vehicle, such that it may be removed and/or transported to at least one alternative industrial vehicle. The system and method will be described in greater detail in the sections herein below.

FIG. 1 depicts an exemplary process-flow diagram providing a method of automatically monitoring a worksite within an industrial environment, in real-time. The steps delineated in FIG. 1 are merely exemplary of an order of monitoring the worksite within the industrial environment. The steps may be carried out in another order, with or without additional steps included therein.

Figure 2:
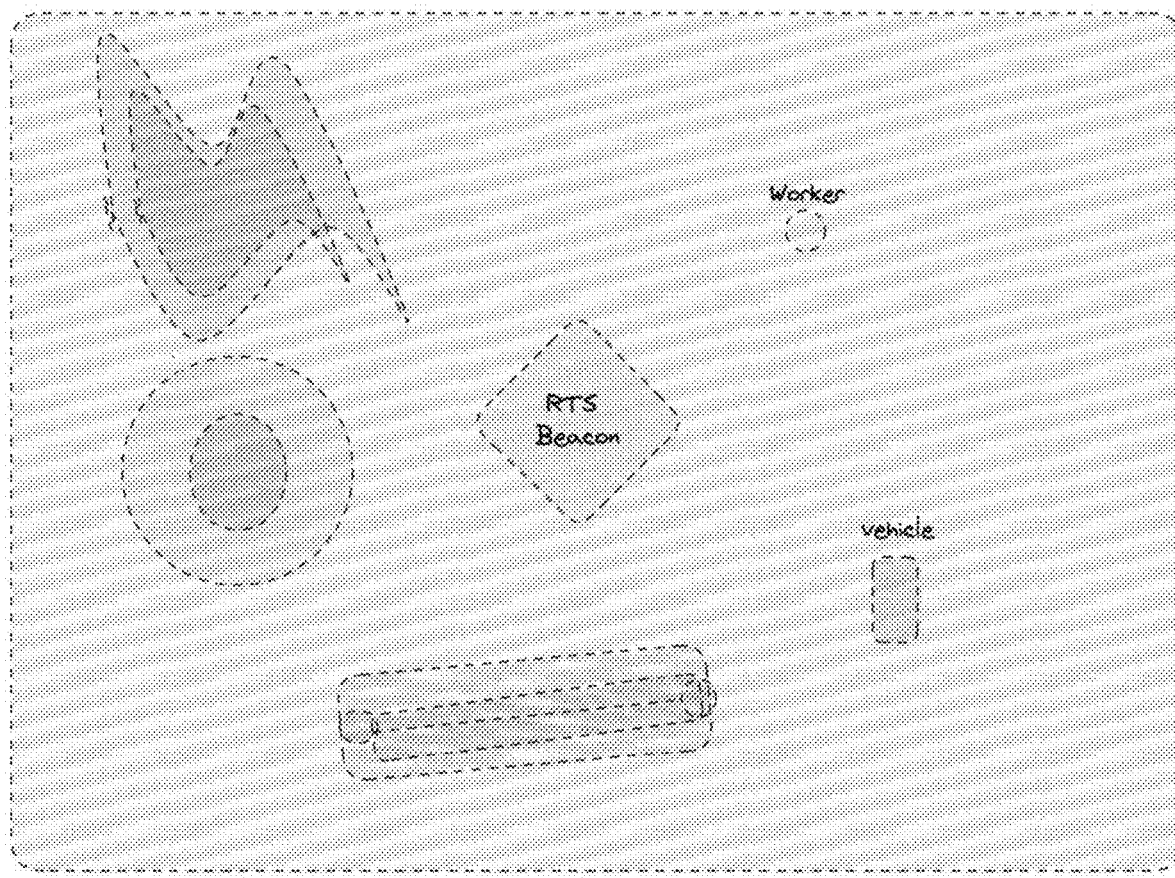
FIG. 2 is a graphical illustration of an industrial environment, according to an embodiment of the present disclosure.

As shown in FIG. 1, in conjunction with FIG. 2, the method 100 begins at step 102, in which a boundary of the industrial environment is determined for a GAP system via the computing device. In an embodiment, as shown in FIG. 2, this step may include the at least one processor of the computing device receiving a boundary (i.e., a perimeter) of the industrial environment (e.g., a geofence of the industrial environment), such as from a user inputting the boundary into the computing device of the at least one beacon and/or at least one receiver, via at least one user interface, and/or automatically via an input provided by a GPS communication network communicatively coupled to the GAP system. In this embodiment, the industrial environment may comprise a predetermined area based on the need and/or size of the entire industrial environment (e.g., a construction worksite and/or an excavation site). For example, in some embodiments, the industrial environment may comprise a total area of less than or equal to roughly three square miles. In addition, in some embodiments, the GPS communication network associated with the GAP system may comprise a satellite communication network constructed to operate a GPS system including a satellite.

Figure 3:
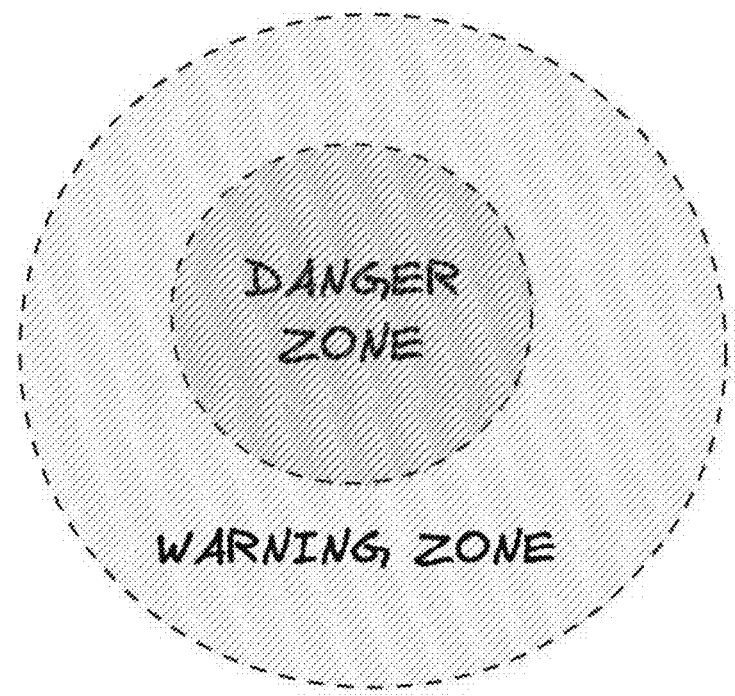
FIG. 3 is a graphical illustration of a plain-point obstacle comprising at least one boundary (e.g., a warning zone and a danger zone), according to an embodiment of the present disclosure.
Figure 4:
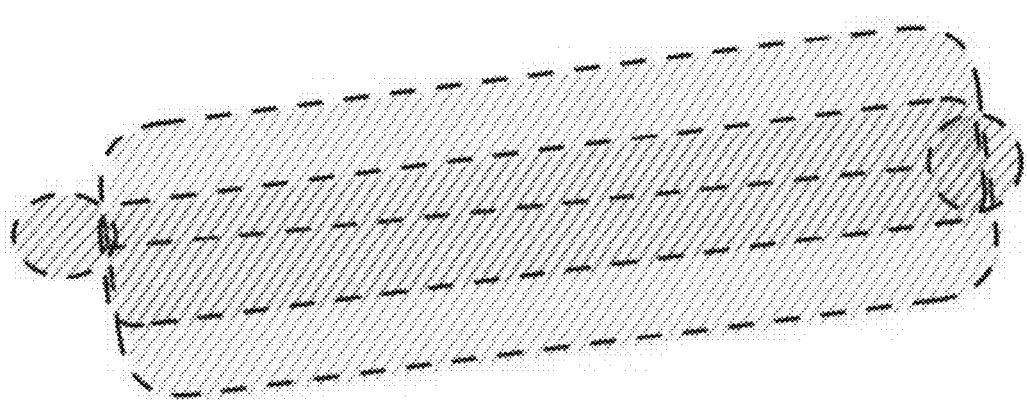
FIG. 4 is a graphical illustration of a multi-point obstacle comprising at least one boundary (e.g., a warning zone and a danger zone), according to an embodiment of the present disclosure.

Next, as shown in FIG. 1, in conjunction with FIG. 3 and FIG. 4, in an embodiment, at step 104 of method 100, the at least one processor of the computing device may be configured to transmit at least one radius of at least one plain point obstacle within the industrial environment to the GAP system. As such, in this embodiment, at least one user and/or GPS communication network may be configured to input a location of the at least one plain point obstacle. In some embodiments, the at least one plain point obstacle may be inputted within the computing device as a singular point, such that the singular point is disposed about a center of the at least one plain point obstacle. As such, subsequent to identifying a location of the plain point obstacle, the at least one processor may be configured to calculate at least one predetermined radius (e.g., a one foot radius) extending outwardly from the at least one plain point obstacle, such that the GAP system may be configured to generate at least one circumferential boundary surrounding the at least one plain point obstacle. In this manner, as shown in FIG. 3, in an embodiment, the GAP system may identify at least two circumferential boundaries of the at least one plain point obstacle as a warning zone and/or a danger zone, respectively, such that the warning zone encompasses the danger zone and a total area of the warning zone is greater than or equal to a total area of the danger zone.

Additionally, as shown in FIG. 4, in an embodiment, the at least one processor of the computing device may be configured to identify and/or transmit at least one multi-point obstacle (hereinafter "obstacle") within the industrial environment to the GAP system. Additionally, at least one user, via the user-interface, and/or the GPS communication network may identify a plurality of waypoints interconnected with each other such that at least one boundary comprising the shape of a parallelogram and/or a polygon may be generated. As such, in this embodiment, subsequent to the boundary of the at least one multi-point obstacle has been identified, the at least one processor of the computing device, may be configured to determine a predetermined length extending outwardly from the plurality of waypoints, such that at least two parallelogram and/or polygonal boundaries of the at least one multi-point obstacle may be generated. In this manner, the at least one processor of the GAP system may identify the at least two parallelogram and/or polygonal boundaries of the multi-point obstacle as a warning zone and/or a danger zone, respectively, such that the warning zone encompasses the danger zone and a total area of the warning zone is greater than or equal to a total area of the danger zone.

Figure 5:
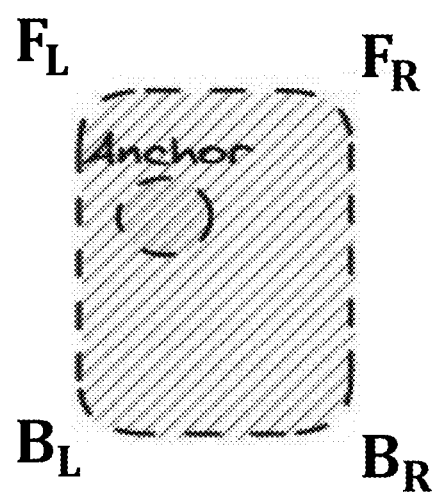
FIG. 5 is a graphical illustration of at least one vehicular boundary of a vehicle comprising a plurality of vehicle nodes and an anchor point, according to an embodiment of the present disclosure.

Referring again to FIG. 1, in conjunction with FIG. 5, in an embodiment, at step 106 of method 100, the at least one processor of the computing device may be configured to transit may least one vehicle boundary within the industrial environment to the GAP system. As such, as shown in FIG. 5, in an embodiment, the at least one receiver communicatively coupled to the computing device associated with the GAP system may be configured to be temporarily affixed to a dashboard of the at least one vehicle. In this manner, as the at least one receiver is temporarily anchored to a point within the at least one vehicle, the at least one receiver may be configured to determine a plurality of vehicle nodes.

In this embodiment, as shown in FIG. 5, the plurality of vehicle nodes may comprise but are not limited to FL (i.e., a front-left most point of the at least one vehicle), FR (i.e., a front-right most point of the at least one vehicle), BL, (i.e., a back-left most point of the at least one vehicle), and/or BR (i.e., a back-right most point of the at least one vehicle). In addition, the receiver may also identify the anchor point of the at least one receiver, such that the anchor point is constant within the vehicle at all times during cessation and operation of the vehicle. As such, based on the determined plurality of vehicle nodes and the anchor point, the at least one receiver may be configured to calculate and/or transmit at least one vehicular boundary to the computing device, such that the at least one vehicular boundary abuts each of the plurality of vehicular nodes. In some embodiments, the at least one vehicular boundary may be within at least one centimeter of a predetermined perimeter of the at least one vehicle.

Next, in an embodiment, at step 108 of method 100, the GAP system may be configured to queue the at least one boundary of the plain point obstacle and/or the multi-point obstacle and the at least one vehicle boundary. Following the GAP system queuing the at least one vehicle boundary and the at least one boundary for the plaint point obstacle and/or the multi-point obstacle, at step 110, the GAP system may be configured to compare the at least one vehicle boundary from the at least one boundary of the plain point boundary and/or the multi-point boundary, such that a distance between by boundaries may be calculated. Finally, the method then proceeds to either step 112 or step 114 depending on whether a substantial match exists between the location of the at least one vehicle boundary and the at least one boundary of the plain-point obstacle and/or the multi-point obstacle.

In an embodiment, during step 112, the GAP system determines that a substantial match does not exist between the location of the at least one vehicular boundary and the location of the at least one boundary of the plain-point obstacle and/or the multi-point obstacle. As such, in this embodiment, during step 112, the GAP system may be configured to execute instructions to maintain the standard operations for the GAP system. Therefore, in this embodiment, the GAP system may be configured to transmit a notification indicative of the standard operation being maintained. Additionally, in some embodiments, subsequent to the determination that the substantial match does not exist, the GAP system may be configured to provide a visual (e.g., a strobe light), auditory (e.g., a beep via at least one speaker), and/or tactile (e.g., a vibrational motor) output indicative of the standard operation being maintained.

Figure 6A:
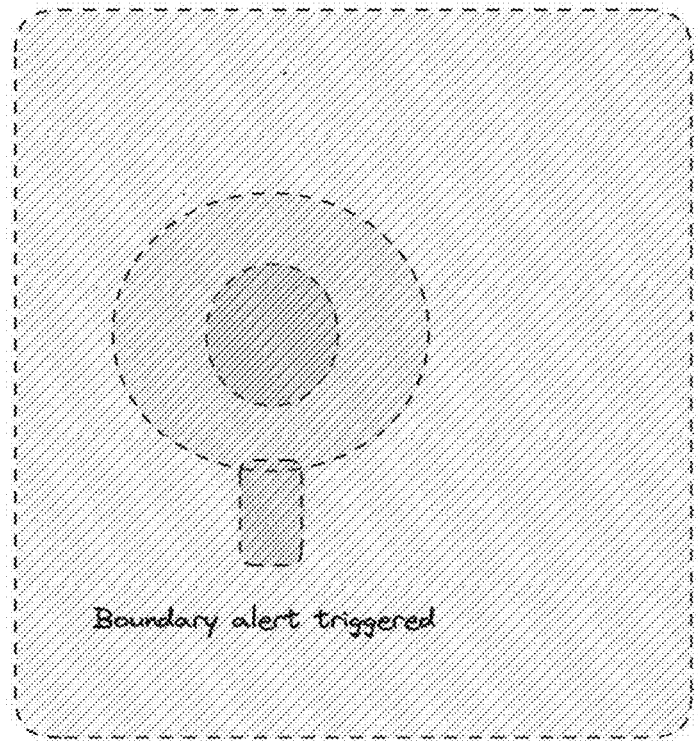
FIG. 6A is a graphical illustration of at least one vehicular boundary of a vehicle abutting a warning zone of at least one plain-point obstacle, according to an embodiment of the present disclosure.
Figure 6B:
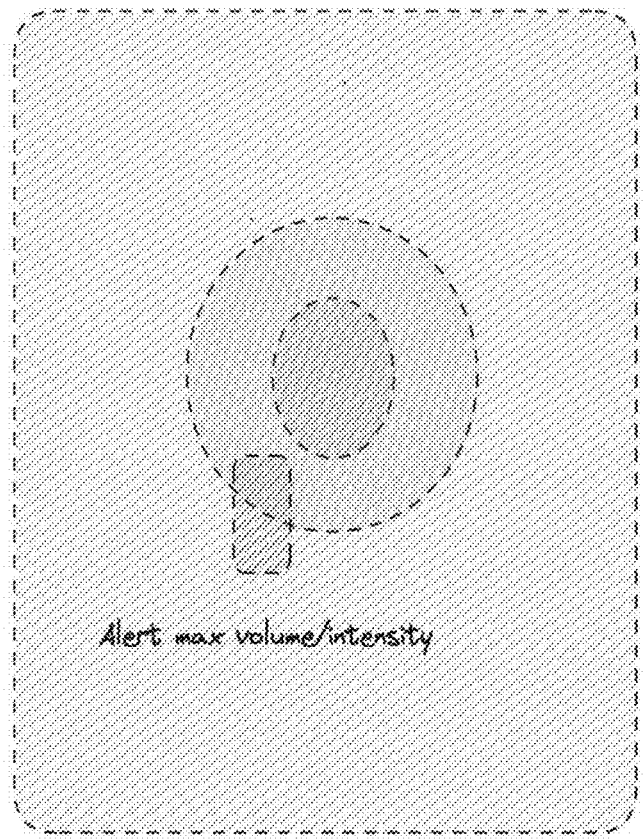
FIG. 6B is a graphical illustration of at least one vehicular boundary of a vehicle within a warning zone of at least one plain-point obstacle, according to an embodiment of the present disclosure.
Figure 6C:
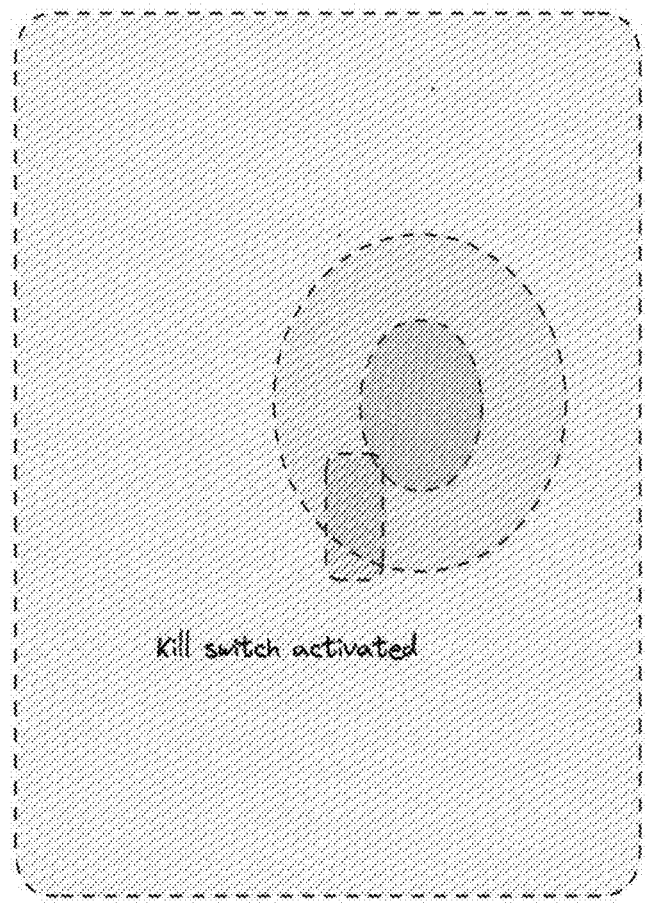
FIG. 6C is a graphical illustration of at least one vehicular boundary of a vehicle within a warning zone and abutting a danger zone of at least one plain-point obstacle, according to an embodiment of the present disclosure.

Referring again to FIG. 1, in conjunction with FIGS. 6A-6C, in an embodiment, during step 114, the GAP system determines that a substantial match does exist between the location of the at least one vehicular boundary and the location of the at least one boundary of the plain-point obstacle and/or the multi-point obstacle. Accordingly, during step 114, the GAP system may be configured to execute instructions to transmit a notification indicative of at least one intersection point between the at least one vehicular boundary and the at least one boundary of the plain-point obstacle and/or the multi-point obstacle. In this manner, in some embodiments, the GAP system may be configured to provide a visual (e.g., a strobe light), auditory (e.g., a beep via at least one speaker), and/or tactile (e.g., a vibrational motor) output indicative of the at least one intersection point between the at least one vehicular boundary and the at least one boundary of the plain-point obstacle and/or the multi-point obstacle.

As such, as shown in FIGS. 6A-6C, in an embodiment, when the at least one portion of the at least one vehicular boundary intersects with at least one portion of the at least one boundary of the at least one plain point obstacle and/or the at least one multi-point obstacle, the at least one processor of the GAP system may be configured to transmit at least one signal to the at least one receiver within the at least one vehicle. In this manner, as shown in FIG. 6A, in this embodiment, when at least one portion of the vehicular boundary abuts and/or intersects at least one portion of the warning zone of the at least one plain-point obstacle and/or the multi-point obstacle, subsequent to receiving the at least one signal from the at least one processor, the at least one receiver may be configured to transmit the notification indicative of entering the warning zone of the at least one plain-point obstacle and/or multi-point obstacle. The at least one receiver may be in electrical communication with and/or communicatively coupled to at least one speaker of the vehicle, such that an auditory message may be provided to the at least one user of the vehicle informing the at least one user of entering the warning zone of the at least one plain-point obstacle and/or the multi-point obstacle. Additionally, the at least one receiver may comprise at least one light and/or an array of lights, such that the at least one receiver may provide a visual output, including but not limited to a strobe pattern. Furthermore, the at least one receiver may comprise at least one vibrational motor, such that a tactile output may be provided to the user.

In addition, as shown in FIG. 6B, in an embodiment, as the at least one vehicular boundary enters further into the warning zone of the at least one plain-point obstacle and/or the multi-point obstacle, the at least one processor may be configured to transmit a signal to the at least one receiver, such that the at least one receiver may be configured to increase an intensity of the auditory, visual, and/or tactile outputs. In this manner, as the distance between the at least one vehicular boundary and the danger zone of the at least one plain-point obstacle and/or the multi-point obstacle decreases, as determined by the GPS communication network, the auditory, visual, and/or tactile output may automatically increase, accordingly.

As shown in FIG. 6C, in an embodiment, the at least one receiver may be in electrical communication with an electrical circuitry of the vehicle, such that when at least one portion of the at least one vehicular boundary abuts the danger zone of the at least one plain-point obstacle and/or the at least one multi-point obstacle, the at least one processor may be configured to transmit at a signal to the at least one receiver, such that the at least one receiver may be configured to deactivate the engine of the vehicle, engage a breaking system of the vehicle, and/or the prevent an electrical current from being provided to the electrical circuitry of the vehicle. As such, in this embodiment, the at least one receiver of the GAP system may be configured to adjust a speed (e.g., increase and/or decrease the vehicle speed to a predetermined level) of the vehicle and/or inhibit a movement (e.g., a forward directional movement and/or a reverse directional movement) of the vehicle within the industrial environment.

Additionally, in some embodiments, subsequent to receiving the at least one signal from the at least one processor, the at least one receiver may be configured to provide the auditory, visual, and/or tactile output at a highest level of intensity available to the at least one receiver. In this manner, the GAP system may be configured to monitor the level of speed of directional movement of a vehicle, in real-time. For example, in some embodiments, subsequent to the vehicle exceeding a predetermined speed limit (e.g., about 5 mph) of the at least one industrial environment, the GAP system may be configured to provide the auditory, visual, and/or tactile output at a highest level of intensity available to the at least one receiver indicative of requesting the average speed of the vehicle to reduce to at most the predetermined speed limit. In addition, in some embodiments, the GAP system may be configured to inhibit access to at least one of a plurality of applications associated with the computing device and/or the at least one external computing device associated with the GAP system (e.g., disabling social media applications, disabling SMS texting, allowing emergency calls only) until the average speed of the vehicle is reduced to at most the predetermined speed limit.

Moreover, in an embodiment, the at least one receiver of the GAP system may further comprise a display device associated with the at least one processor of the computing device, such that a geolocation map may be displayed. As such, in some embodiments, the warning zone may be notated as an orange area and/or the danger zone may be notated as a red area on the display device. Accordingly, in these other embodiments, the at least one user may be configured to verify the accuracy of the at least one plain-point obstacle and/or multi-point obstacle as indicated on the display device of the at least one receiver and/or computing device.

In addition, in some embodiments, the GAP system may be configured to monitor and/or track at least one of a plurality of assets, via the GPS system communicatively coupled to the GAP system. In this manner, at least one beacon may be disposed on at least one of the plurality of assets, such that the real-time location of the at least one asset may be visualized on the display device associated with the at least one processor of the computing device communicatively coupled to the GAP system.

For example, in these other embodiments, when at least one portion of the at least one asset (e.g., transportable goods, individuals, machinery, and/or industrial environment equipment) exits and/or is removed from at least one portion of the at least one boundary of predetermined perimeter about the at least one vehicle, the at least one industrial environment, and/or the at least one computing device associated with the GPS system of the GAP system, the at least one processor of the GAP system may be configured to transmit at least one signal to the at least one receiver within the at least one vehicle and/or the at least one processor of the computing device communicatively coupled to the GAP system. In this manner, subsequent to receiving the at least one signal from the at least one processor, the at least one receiver may be configured to transmit the notification indicative of exiting the predetermined perimeter (e.g., acceptable area for the asset to be disposed (e.g., about 1 foot, about 5 feet, about 10 feet, about 20 feet, and/or about 50 feet) (e.g., transporting goods within a vehicle)) about the at least one vehicle, the at least one industrial environment, and/or the at least one computing device associated with the GPS system of the GAP system. Additionally, in these other embodiments, the computing device may be configured to provide a haptic feedback, a visual feedback, and/or an auditory feedback associated with the notification indicative of exiting the predetermined perimeter, via the display device of the computing device associated with the GAP system.

In some embodiments, the GAP system may further comprise at least one security measure, including but not limited to data encryption and/or user authentication at the at least one user interface of the at least one beacon and/or at least one receiver. In this manner, the GAP system may be configured to protect sensitive information and/or ensure that only authorized personnel may be able to access and/or modify any geofencing and/or geo-positional data. Additionally, in these other embodiments, the GAP system may be configured to accommodate various industrial environments and/or integrate seamlessly with existing safety protocols and/or equipment.

In some embodiments, in addition to the core geofencing functionality, the GAP system may be configured to integrate with any workplace safety system known in the art, including but not limited to automated machinery control, access control systems, emergency response systems, worker tracking and analytics, training and simulation, and/or IoT integration.

Referring now to FIGS. 7-13, another aspect of the present disclosure pertains a system of and method for automatically monitoring a hazard, an industrial environment, and/or a project associated with the hazard and/or the industrial environment, in real-time. The system of (i.e., the GAP system) and method for automatically monitoring the hazard, the industrial environment, and/or the project associated with the hazard and/or the industrial environment, in real-time, will be described in greater detail herein below.

Figure 7:
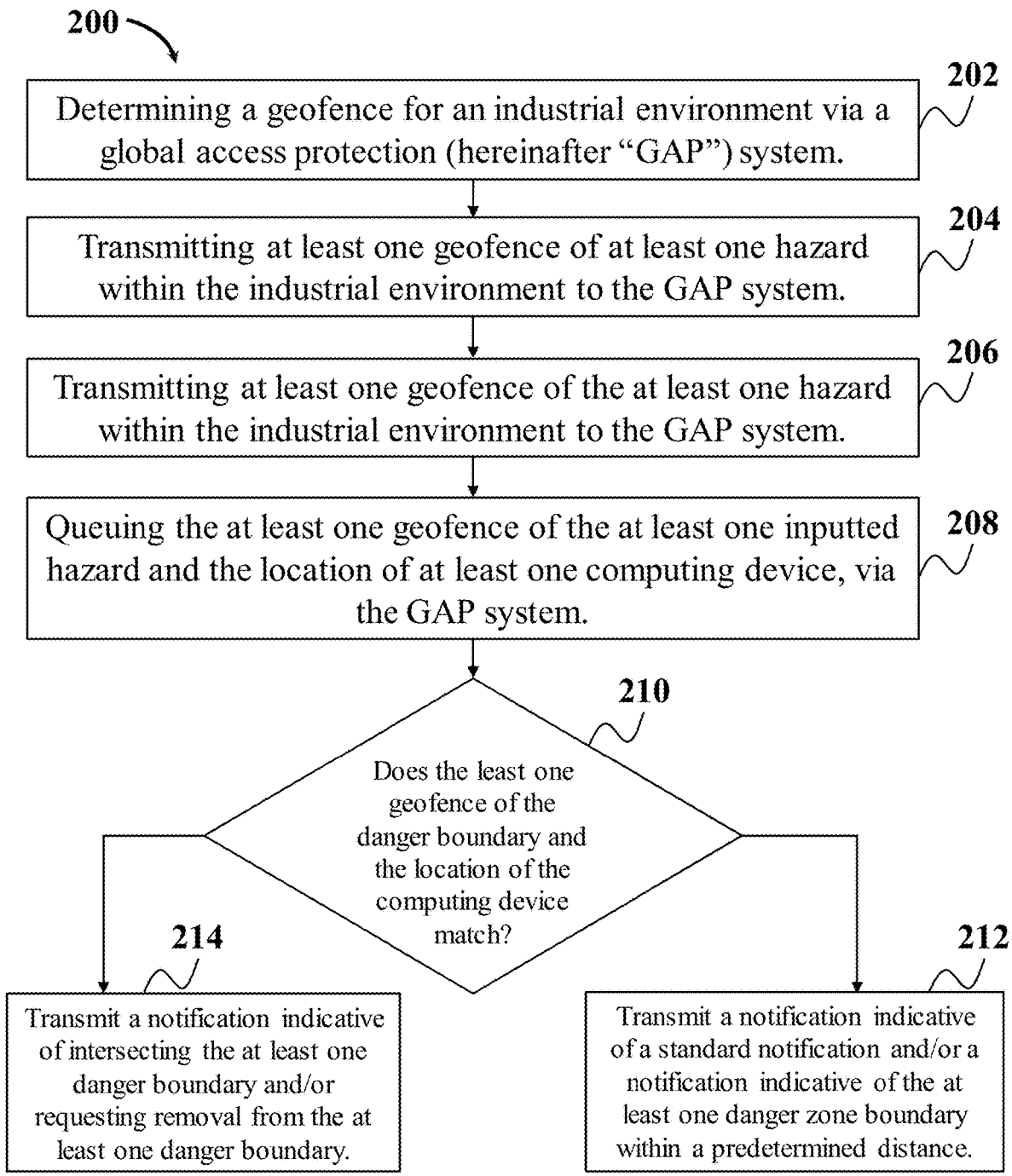
FIG. 7 is a process-flow diagram providing a second exemplary method of automatically monitoring an industrial environment, in real-time, according to an embodiment of the present disclosure.

As shown in FIGS. 7-13, a second embodiment of a method of automatically monitoring the hazard, the industrial environment, and/or the project associated with the hazard and/or the industrial environment, in real-time, is generally indicated as 200. The steps delineated in FIG. 7 are merely exemplary of an order of automatically monitoring an industrial environment. The steps may be carried out in another order, with or without additional steps included therein.

Figure 8:
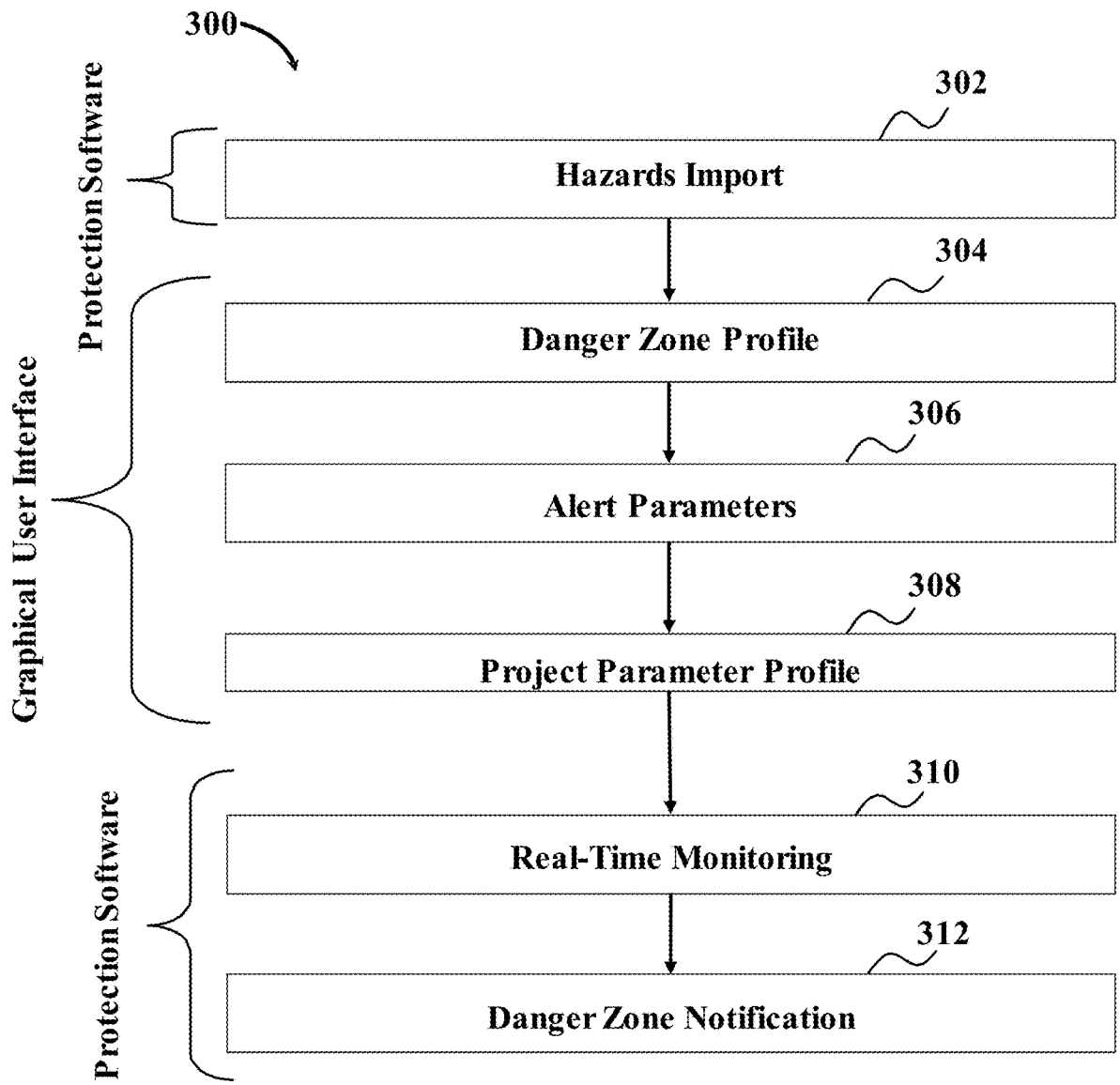
FIG. 8 is a flow diagram of modules for a global access protection system, according to an embodiment of the present disclosure.

FIG. 8 depicts a flow diagram of modules for the vacation packaging configurator, according to an embodiment of the present disclosure. In an embodiment, the global access protection system 300 may include several aspects within the system. In this embodiment, the global access protection system 300 may comprise a plurality of hazard imports 302, a danger zone profile 304, an alter parameter aspect 306, an additional parameter profile aspect 308, a real-time monitoring aspect 310, and/or a danger zone notification aspect 312. In this embodiment, the plurality of hazard imports 302, a real-time monitoring aspect 310, and/or a danger zone notification aspect 312 may be primarily software based only. The danger zone profile 304, an alter parameter aspect 306, an additional parameter profile aspect 308 may be configured to allow the user to interact with the global access protection system 300, via the at least one user interface communicatively coupled to global access protection system 300. Each of these aspects will be further detailed in the sections below.

As such, as shown in FIG. 7, in conjunction with FIGS. 8-13, in an embodiment, method 200 may begin at step 202, in which a geofence of at least one hazard within an industrial environment may be determined for the global access protection (hereinafter "GAP") system via a computing device of the GAP system. In an embodiment, as shown in FIG. 7, this step may include the at least one processor of the computing device receiving a geofence (i.e., a perimeter) of at least one of a plurality of potential hazards within the industrial environment (e.g., a geofence of the industrial environment), such as from a user inputting the hazard geofence into the computing device, via at least one user interface, and/or automatically via an input provided by a GPS communication network communicatively coupled to the GAP system.

In an embodiment, the industrial environment may comprise a predetermined area based on the need and/or size of the entire industrial environment (e.g., a construction worksite and/or an excavation site). For example, in some embodiments, the industrial environment may comprise a total area of less than or equal to roughly three square miles. In addition, in some embodiments, the GPS communication network associated with the GAP system may comprise a satellite communication network constructed to operate a GPS system including a satellite. As such, in this embodiment, step 202 of method 200 may also include communicatively coupling an ARI and/or API to the GAP system, such that the GAP system may be configured to automatically search and/or cache data of the plurality of hazards within at least one danger zone, in real-time. In some embodiments, the GAP system may comprise ARI and/or API within the software of the GAP system to automatically search and/or cache data of the plurality of hazards within the at least one danger zone.

In this manner, as disclosed above, the term "hazard" refers to any condition known in the art that may cause injury and/or death to an individual and/or loss of product and/or property. Non-limiting examples of a hazard may include chemicals and/or biologics that cause acute and/or long-term detrimental health effects (e.g., neurotoxins, immune agents, dermatologic agents, carcinogens, sensitizers, bacteria, fungi, and/or viruses), individual worksite members, heat and/or cold stress, vibration, noise, loss of cellular communication, a weather event (e.g., tornado, hurricane, and/or flood), and/or roadway issue (e.g., car crash, pothole, and/or car on fire). For ease of reference, the exemplary embodiment described herein refers to chemicals and/or biologics, weather events, individual worksite members (e.g., at least one alternative user of the GAP system), loss of cellular communication and/or roadway issues, but this description should not be interpreted as exclusionary of other conditions that may cause injury and/or death to the individual and/or loss of product and/or property.

Next, as shown in FIG. 7, in conjunction with FIGS. 9A-13, in an embodiment, method 200 may proceed to step 204, in which the GAP system may be configured to receive, via the plurality of hazard inputs provided by the at least one user and/or at least one service provider (e.g., FDOT), at least one parameter from the user regarding the at least one danger zone. In an embodiment, the set of parameters form the at least one user and/or the at least one service provider may include but are not limited to a safety range, a point of interest (hereinafter "POI"), a hazard zone, a progress photo, compliance requirements, confirmations, a document upload requirement, a milestone, project completion percentage, compliance check, and/or inspection points.

Figure 9A:
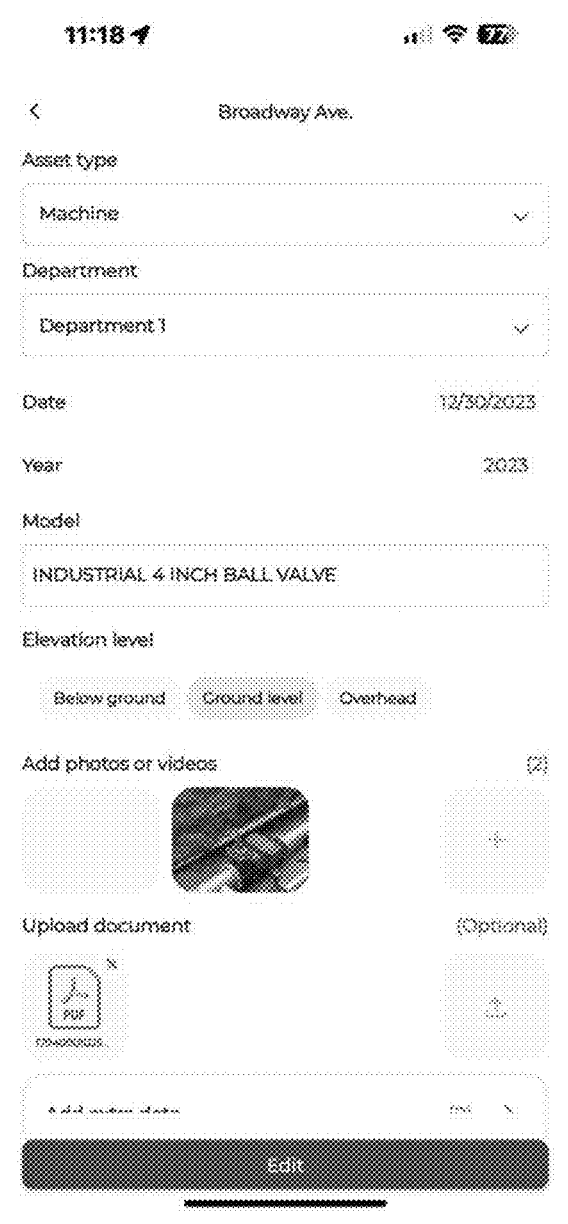

FIG. 9A depicts a danger zone capture module of danger zone profile aspect 304, as shown in FIG. 7 for hazard selection and/or marking on the GAP system, according to an embodiment of the present disclosure. In this embodiment, the danger zone profile aspect 304 may include a plurality of options, suggestions, and/or questions which the user may select, allowing the GAP system software to filter potential hazard matches. In this manner, as shown in FIG. 9A, the plurality of options include but is not limited to an address and/or location (e.g., general area (i.e., specific street, building, airport, etc.)), an asset type (e.g., a machine, pipe, and/or any equipment known in the art which may be found in an industrial environment), at least one geofence associated with the at least one hazard (e.g., a plurality of predetermined distances associated with the hazard (i.e., an appropriate distance to safely observe and/or avoid the at least one hazard)), a department (e.g., plumbing, construction, corporate, etc.), a date of hazard, a year of hazard, a model of the asset type, an elevation, level of risk, a weather condition, a photo, required documentation, and/or any personal notes provided by the user.

In this manner, in this embodiment, the hazard zone may comprise a plurality of ranges (e.g., geofence, perimeter, and/or circumference) which may be inputted by the user, such that each range of the hazard zone may comprise an alternative level of risk (e.g., a geofence of 20 feet comprising a severe risk, a geofence of 20 yards comprising a moderate risk, a geofence of 20 miles comprising a low risk). In this embodiment, the plurality of options, suggestions, and/or questions of danger zone profile aspect 304 may increase or decrease based on the initial selection and/or continued selection of the hazard and/or the plurality of options by the user and/or service provider. For example, in some embodiments, when the user provides "valve" under model of asset type and/or plumbing under "department", the user no longer has the option to select "construction" and/or "corporate" under "department, in addition to limiting the asset types available for selection.

Figure 9B:
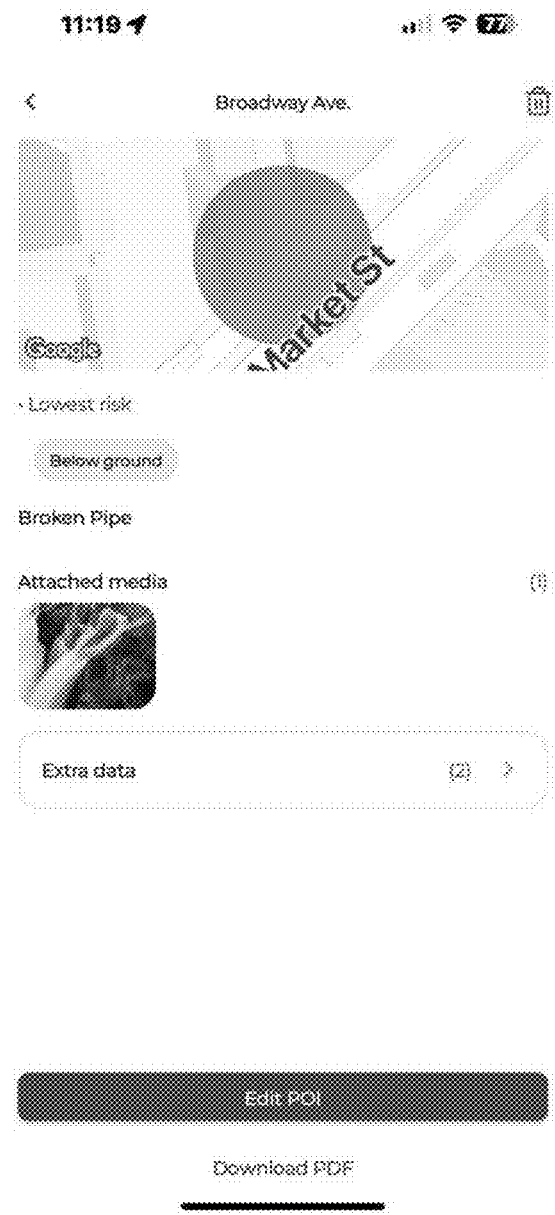
FIG. 9B is a graphical illustration of a selected parameters of the danger zone selection module of FIG. 9A of a danger zone profile of a global access protection system, according to an embodiment of the present disclosure.

In an embodiment, the GAP system may be configured to automatically remove at least one of the plurality of options based on the selection of the user, type of industrial environment, and/or address and/or location, increasing the efficiency of the user of the GAP system to optimize hazard identification within the industrial environment and/or within a generalized location (e.g., within 30 miles of the selected hazard). Moreover, as shown in FIG. 9B, in this embodiment, danger zone profile aspect 304, may comprise a danger zone review module, such that the user and/or service provider may review the output of the danger zone capture module where the at least one of the plurality of hazards within the industrial environment were inputted. In addition, as shown in FIG. 9B, the danger zone review module output may be configured to allow additional media (e.g., images, videos, multimedia, and/or GIF) to be inputted, such that an up-to-date image/multimedia video may be provided to allow at least one alternative user and/or the service provider to see a current status of the marked hazard.

In this embodiment, as shown in FIG. 9B, the danger zone review module may comprise at least one additional aspect, such that the at least one user and/or service provider may input any additional personal notes, documents, and/or material associated with the hazard into danger zone profile aspect 304. In this embodiment, the danger zone review module may comprise an image depicting an image comprising a perimeter of the hazard range inputted by the at least one user and/or service provider, such that the area may be visualized on a geographical map (e.g., a satellite image, traffic map, and/or a hybrid map comprising the traffic map superimposed on the satellite image). In this manner, the level of risk associated with the marked hazard may be visualized on the danger zone review module.

In an embodiment, the at least one user and/or service provide may interact with the danger zone review module provided by the GAP system. As such, when the at least one user and/or service provider interacts with the danger zone review module, via the user interface, the GAP system may expand the geographical map of the at least one hazard. In this manner, in this embodiment, the GAP system may provide additional details and/or a precise location of the at least one hazard inputted within the danger zone review module on a display device communicative coupled to the computing device associated with the GAP system, as shown in FIGS. 9A-9C.

Referring again to FIG. 7, in an embodiment, method 200 may proceed to step 206, such that the GAP system may be configured to transmit at least one danger boundary (hereinafter "geofence" and/or "perimeter" and/or "circumference") about at least one marked hazard within the industrial environment. As such, FIG. 9C, in conjunction with FIG. 7, depicts danger zone profile aspect 304 of the GAP system, according to an embodiment of the present disclosure. In this manner, the GAP system may be configured to identify a geofence (e.g., a perimeter and/or a circumference) associated with the hazard range (e.g., 20 inches, 20 feet, 20 miles away from the marked hazard). Accordingly, in this embodiment, the GAP system may be communicatively coupled to a GPS system of the computing device (e.g., a mobile computing device, a tablet, and/or a handheld device) and/or at least one external computing device (e.g., at least one alternative mobile computing device, tablet, and/or handheld device of at least one alternative user), such that the GAP system may be configured to monitor and/or track a location of the computing device and/or at least one external computing device as it relates to the geofence of the at least one marked hazard.

Figure 9C:
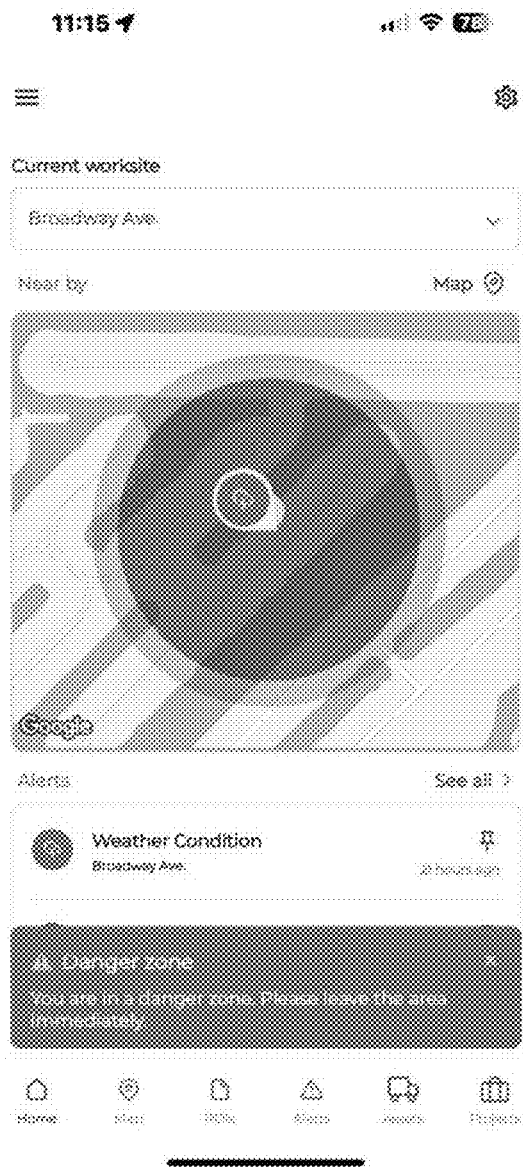
FIG. 9C is a graphical illustration of the danger zone profile of FIG. 9B of a global access protection system, according to an embodiment of the present disclosure.

In an embodiment, as shown in FIG. 9C, danger zone profile aspect 304 may be configured to visualize the geofence of the marked hazard (e.g., a shaded red circle surrounding the marked hazard and/or weather condition) and the precise location of the computing device and/or external computing device of the at least one user and/or service provider on the display device communicatively coupled to the computing device and/or at least one external computing device.

Moreover, in an embodiment, as stated above, the GAP system may also comprise at least one memory (e.g., distributed ledger) associated with the computing device, such that the GAP system may be configured to automatically capture, in real-time, at least one of the plurality of hazards disposed about at least one of a plurality of industrial environments from the at least one user. Accordingly, in this embodiment, the GAP system may be configured to input a profile of a user and/or a profile of a service provider and/or suggest at least one hazard comprising similar features as defined by at least one parameter provided by the user, based on the real-time condition of the industrial environment selected by the user and/or service provider.

Next, referring again to FIG. 7, in an embodiment, at step 208 of method 200, the GAP system may be configured to que the at least one geofence of the at least one marked hazard and the location of the at least one computing device.

At step 210 of method 200, as shown in FIG. 2, in an embodiment, the GAP system may compare the received real-time geofence of the at least one hazard within the industrial environment from the at least one user and/or service provider, via the user-interface and/or the ARI and/or the at least one API to the location of the at least one computing device and/or the at least one external computing device associated with the GAP system. The method then proceeds to either step 212 or step 214 depending on whether a substantial match exists between the received real-time geofence of the at least one hazard within the industrial environment and the location of the at least one computing device and/or the at least one external computing device associated with the GAP system. In some embodiments, the GAP system may regularly update the at least one geofence of the at least one marked hazard at predetermined intervals to maintain accuracy of the real-time condition of the industrial environment.

During step 212 of method 200, in an embodiment, the GAP system may determine that a substantial match does not exist between the received real-time geofence of the at least one hazard within the industrial environment and the location of the at least one computing device and/or the at least one external computing device associated with the GAP system. As such, during step 212, in this embodiment, the GAP system may be configured to execute instructions to activate and/or transmit a notification, via the display device communicatively coupled to the at least one computing device and/or the at least one external computing device, presenting the information to the user indicative of a distance away from an outer-most geofence of the at least one marked hazard within the industrial environment. In some embodiments, the GAP system, via the display device, may be configured verbalize the notification of the GAP system and/or may provide a haptic feedback associated with the notification.

In an embodiment, during step 214 of method 200, the GAP system may determine that a substantial match does exist between the received real-time geofence of the at least one hazard within the industrial environment and the location of the at least one computing device and/or the at least one external computing device associated with the GAP system. Accordingly, during step 214, in this embodiment, the GAP system may transmit a notification, via the display device, to the user indicative of intersecting at least one of the plurality of geofences of the marked hazard. As such, in this embodiment, the GAP system may provide an alert, such that the notification may request removal of the at least one computing device and/or the at least one external device from each of the plurality of geofences of the marked hazard. In this manner, the GAP system may be configured to inhibit access to at least one of a plurality of applications associated with the computing device and/or the at least one external computing device (e.g., disabling social media applications, disabling SMS texting, allowing emergency calls only) until the location of the computing device and/or the at least one external device is removed from any portion of the plurality of geofences of the marked hazard.

As such, in some embodiments, the GAP system may be configured to retain the alert and/or notification until the location of the at least one computing device and/or the at least one external computing device is disposed outside the outermost geofence of the marked hazard. Moreover, in these other embodiments, the GAP system may direct the user to an emergency alert page (e.g., FDOT website) of at least one service provider, presenting the user with the real-time notifications, including but not limited to a status update of the risk level associated with the marked hazard, a real-time timeline of a clean-up of the marked hazard (e.g., providing timestamp updates of each step of the clean-up associated with the marked hazard), and/or an all-clear status associated when the marked hazard has been removed, cleaned, and/or eliminated.

In addition, in some embodiments, the GAP system may be configured to directly transmit an emergency notification and/or notification associated with an marked hazard of any service provider (e.g., FDOT) known in the art directly to the at least one computing device and/or the at least one external computing device associated with the GAP system. For example, in these other embodiments, if a chemical leak has occurred, such that the chemicals have been disposed about a road, the at least one service provider may send an emergency notification (e.g., emergency broadcast) to the GAP system, such that the GAP system may transmit a notification to the display device associated with the computing device and/or the at least one external computing device for a predetermined period of time (e.g., 30 seconds, 1 minute, and/or 5 minutes). In addition, the GAP system may be configured to transmit the notification to the at least one computing device and/or at least one external computing device, such that a haptic feedback (e.g., vibration) may be provided to the at least one user associated with the emergency notification. Furthermore, in these other embodiments, the GAP system may be configured to provide alternate routes and/or provide suggestions on new directions in order to avoid the marked hazard and/or cause the at least one user to remove the at least one computing device associated with the GAP system from each of the plurality of geofences associated with the marked hazard.

In some embodiments, the GAP system may be communicatively coupled to a processor of a computing device associated with the vehicle of the at least one user. As such, when the GAP system determines that a substantial match exists between the received real-time geofence of the at least one hazard within the industrial environment and the location of the computing device of the vehicle associated with the GAP system, the GAP system may be configured to facilitate hazard avoidance of each of the plurality of geofences associated with the marked hazard. In this manner, the GAP system, via the processor of the computing device of the vehicle, may be configured to adjust the speed of the vehicle (e.g., slow down the vehicle as it approaches at least one of the plurality of geofences associated with the marked hazard), the direction of the vehicle (e.g., taking an alternate route to avoid at least one of the plurality of geofences associated with the marked hazard), and/or inhibit a movement of a vehicle (e.g., stop a vehicle before it reaches the inner most geofence of the plurality of geofences associated with the marked hazard).

Figure 10A:
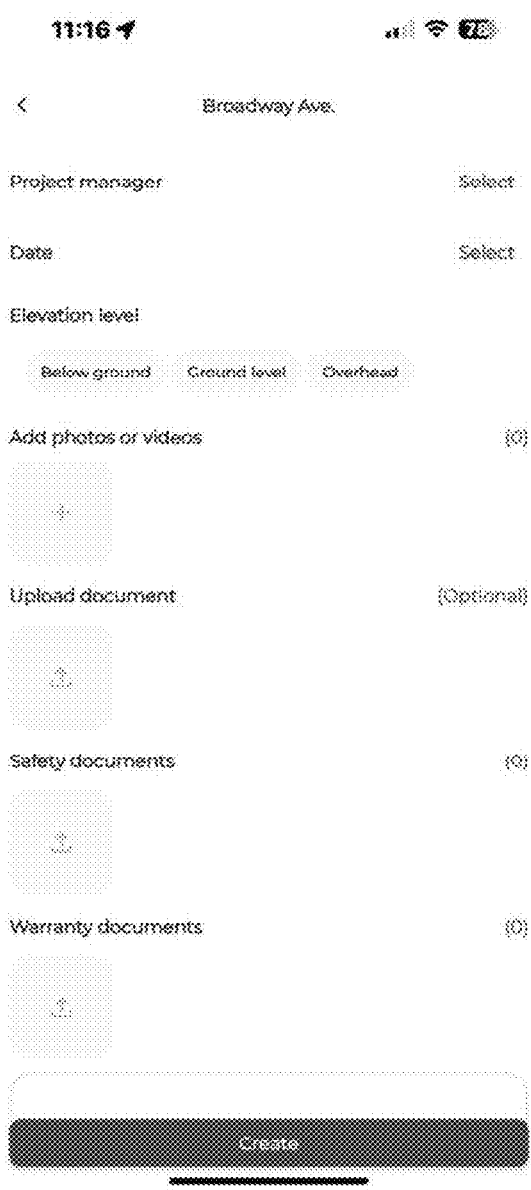
FIG. 10A is a graphical illustration of a project selection module of a project profile of a global access protection system, according to an embodiment of the present disclosure.
Figure 10B:
FIG. 10B is a graphical illustration of the project profile of FIG. 10A of a global access protection system, according to an embodiment of the present disclosure.

As shown in FIG. 8, in conjunction with FIGS. 10A-13, another aspect of the present disclosure pertains to a project parameter profile 308 of the GAP system. As shown in FIG. 10A and FIG. 10B, in an embodiment, as disclosed above, the GAP system may be communicatively coupled to at least one external computing device (e.g., at least one alternative computing device associated with the GAP system) and/or at least one external server (i.e., a corporate server). In this manner, as shown in FIG. 10A, a project associated with an industrial environment may be uploaded by a corporate office, such that each computing device associated with the GAP system may update, in real-time, with the projected associated with the industrial environment. As such, the project parameter profile 308 may be configured to allow the at least one user to input, via the user-interface, a plurality of options associated with each project. Non-limiting examples of the plurality of options may include project manager, date, elevation level of the industrial environment, risk level of the project, photos associated with the industrial environment, multimedia associated with the industrial environment, required documentation associated with the industrial environment, warranties, and/or safety and/or insurance documentation. For example, as shown in FIG. 10B, in some embodiments, once the at least one user inputs, via the user interface, each of the selected plurality of options, the GAP system may be configured to automatically generate a project profile, such that each person assigned to the project (e.g., project manager, corporate officers, and/or industrial environment workers) may simultaneously view the generated project profile and each respective computing device associated with the GAP system.

Furthermore, in some embodiments, once the GAP system generates the project profile, the GAP system may be configured to transmit the generated project profile to a memory of the at least one computing device and/or the at least one external server, such that the generated project profile may be accessed by the at least one user for a predetermined period of time (e.g., throughout the project timeline, 10 years, 20 years, and/or 50 years). Additionally, in these other embodiments, the GAP system may be communicatively coupled to at least one computing device and/or at least one server associated with at least one service provider (e.g., FDOT), such that the generated project profile may be automatically transmitted to the at least one service provider. In this manner, the GAP system may be configured to automatically update the records of the at least one service provider, such that the project may be readily identified and documented by the at least one service provider, increasing efficiency of communication and/or approval of the generated project profile by the at least one service provider.

Figure 11:
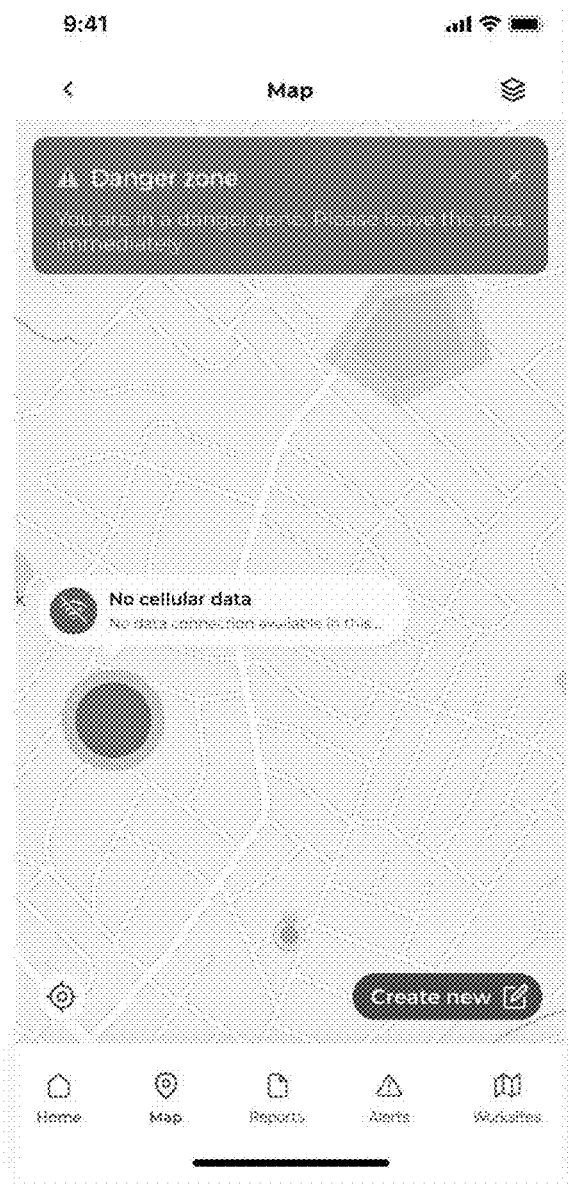
FIG. 11 is a graphical illustration of a Map profile of a global access protection system, according to an embodiment of the present disclosure.

Additionally, as shown in FIG. 11, in an embodiment, the GAP system may comprise a Map profile, the map profile being configured to output, via the display device associated with the at least one computing device and/or the at least one external computing device, each marked hazard disposed about a geographical map (e.g., satellite image, traffic map, and/or a hybrid map comprising the traffic map superimposed on the satellite image). In this manner, the MAP profile may be configured to also visualize the real-time location of the at least one computing device and/or the at least one external computing device, via the GPS system associated with the at least one computing device and/or the at least one external computing device, with respect to each marked hazard. In this embodiment, when the at least one user interacts (e.g., clicks on the marked hazard) with each disposed marked hazard, via the user interface, the Map profile may be configured to provide additional details associated with the danger zone profile of the marked hazard (e.g., No cellular data, as shown in FIG. 11).

Moreover, as disclosed above, the Map profile may also be configured to transmit a notification indicative of an alert to the at least one user that the location of the at least one computing device and/or the at least one external computing device intersects with at least one of the plurality of geofences associated with the marked hazard. As such, the Map profile of the GAP system may also highlight and/or recommend the removal of the at least one computing device and/or the at least one external computing device from each of the plurality of geofences associated with the marked hazard. In some embodiments, the GAP system may be configured to transmit a haptic feedback (e.g., vibration) to the at least one computing device and/or external computing device for a predetermined period of time and/or until the location of at least one computing device and/or the at least one external computing device is outside each of the plurality of geofences associated with the marked hazard.

Additionally, in some embodiments, the Map profile may be communicatively coupled to at least one third-party server, such that a third-party supplier and/or a third-party provider (e.g., labor force suppliers, equipment suppliers, personal protective equipment suppliers, hotels, and/or restaurants) may input a plurality of advertisements and/or industrial environment-related material into the Map Profile. In this manner, in these other embodiments, the Map profile, via the display device associated with the at least one computing device and/or at least one external computing device may present the plurality advertisements and/or industrial environment-related material, in real-time, such that the geographical location of the third-party supplier and/or provider may be visualized.

Furthermore, in an embodiment, the Map profile, via the processor of the at least one computing device and/or the at least one external computing device, may be configured to transmit a notification indicative of at least one of the plurality of advertisements and/or industrial related material of the at least one third-party supplier and/or provider associated with the at least one marked hazard and/or the at least one industrial environment. For example, in these other embodiments, subsequent to the location of at least one computing device and/or the at least one external computing device achieving a predetermine distance (e.g., 15 miles from the at least one third-party supplier and/or provider) the Map profile may be configured to transmit a notification indicative of at least one of the plurality of advertisements and/or industrial related material of the at least one third-party supplier and/or provider associated with the at least one marked hazard and/or the at least one industrial environment.

Figure 12:
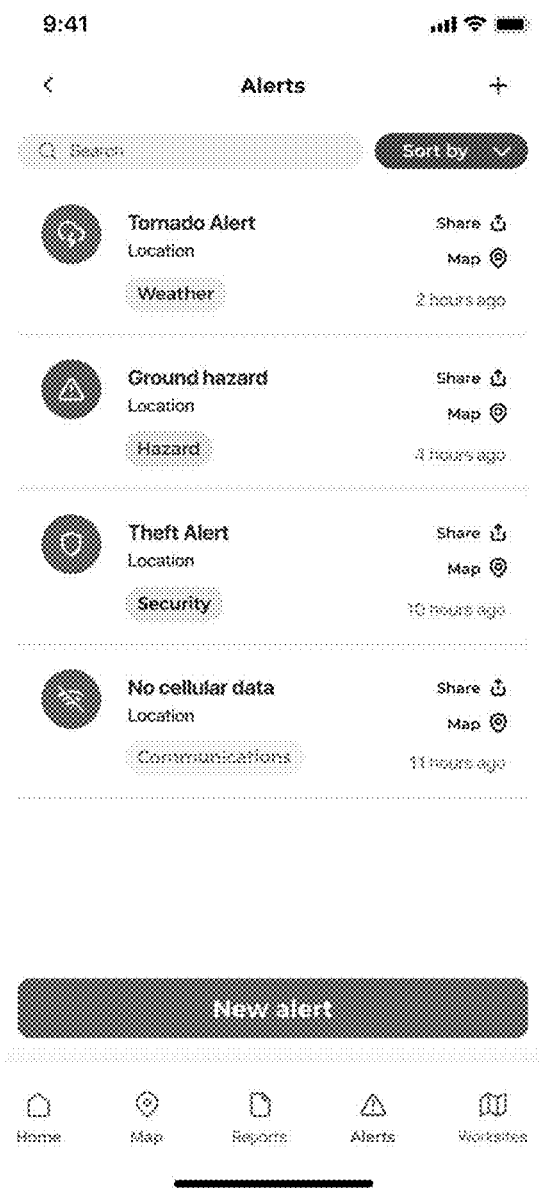
FIG. 12 is a graphical illustration of an alert profile of a global access protection system, according to an embodiment of the present disclosure.

FIG. 12 depicts a graphical illustration of an alert profile of the GAP system, according to an embodiment of the present disclosure. In this embodiment, the alert profile may be configured to output, via the display device associated with the at least one computing device and/or the at least one external computing device, each marked hazard in a list format (e.g., blocks, tiles, icons, detailed list, content). In this manner, the GAP system may be communicatively coupled to the at least one computing device and/or the at least one external computing device and/or at least one server of the at least one service provider, such that the at least one user and/or the at least one service provider (e.g., FDOT) may provide real-time warnings associated with each marked hazard within each industrial environment of a predetermined area (e.g., Tampa Bay area, Orlando, Miami, etc.). As such, as shown in FIG. 12, in this embodiment, the alert profile of the GAP system may be configured to automatically update at a predetermined rate (e.g., every 5 minutes, every minute, every 30 seconds, etc.), such that the GAP system may provide the user with real-time notifications highlighting each marked hazard associated with each industrial environment within the predetermined area.

Moreover, as shown in FIG. 12, in an embodiment, the alert profile of the GAP system may be communicatively coupled to the Map profile of the GAP system. In this manner, the GAP system may be configured to transition output, via the display device associated with the at least one computing device and/or at least one external computing device, such that subsequent to an input provided by the at least one user, via the user-interface associated with the computing device communicatively coupled to the GAP system, the GAP system may be configured to transition from the alert profile to the Map profile. As such, the selected marked hazard, by the at least one user, may be highlighted on the Map profile, such that the exact geographical location of the marked hazard and/or the at least one geofence associated with the marked hazard may be visualized, via the display device.

Additionally, in an embodiment, the alert profile may be configured to allow the at least one user to input a new alert, in real-time, via the user-interface. Accordingly, the alert profile may provide a plurality of options (e.g., type of hazard (e.g., chemical leak, theft, weather event, communication loss), risk of hazard, location of hazard, and/or safety items (e.g., safety shower locations, fire extinguishers, ropes, and/or life jackets), such that the at least one user may input the appropriate details highlighting the marked hazard related to the industrial environment. Furthermore, in this embodiment, the alert profile of the GAP system may be communicatively coupled to the processor of the computing device associated with the GAP system, such that the GAP system may be configured to transmit via SMS, instant messenger, email, and/or any electronic communication known in the art, the plurality of warnings/notifications inputted within the alert profile.

In this manner, as shown in FIG. 12, in an embodiment, the alert profile of the GAP system may be configured to sort and/or search the plurality of warnings/notifications inputted within the alert profile. As such, the GAP system may be configured to allow the user, via the at least one user interface associated with the at least one computing device communicatively coupled to the GAP system, to search for specific inputted alerts and/or sort the plurality of warnings/notifications by a plurality of filters. Non-limiting examples of the plurality of filters may include risk of hazard, type of hazard, location of hazard with respect to the location of the at least one computing device and/or at least one external computing device (i.e., distance of hazard from the at least one user), time the warning/notification was inputted into the alert profile by the at least one user and/or the at least one service provider.

Figure 13:
FIG. 13 is a graphical illustration of a worksite profile of a global access protection system, according to an embodiment of the present disclosure.

In addition, as shown in FIG. 13, in an embodiment, the GAP system may comprise a worksite profile, the worksite profile being configured to optimize identification and selection of workers within a specific industrial environment/project. As such, the worksite profile of the GAP system may be communicatively coupled to at least one server associated with the organization, team, service provider, and/or individual assigned to the industrial environment and/or project. In this embodiment, the worksite profile of the GAP system may be configured to allow the user, via the user interface associated with the GAP system, to input a plurality of options associated with the assigned industrial environment and/or project. Accordingly, in this embodiment, non-limiting examples of the plurality of options associated with the assigned industrial environment and/or project may include the individual team members, the worksite associated with the industrial environment and/or project, the work hours associated with the worksite, the name of the organization and/or team associated with the industrial environment and/or project, and/or the geographic location of the industrial environment and/or project.

In this manner, subsequent to the at least one user inputting, via the user interface associated with the computing device communicatively coupled to the GAP system, the GAP system may be configured to automatically transmit a notification in real-time indicative of the selected plurality of options chosen by the at least one user. For example, in some embodiments, when each individual team member is selected and/or inputted by the at least one user, via the user interface, the worksite profile of the GAP system may be configured to transmit a notification indicative of the selection to each selected team member, via any electronic communication known in the art (e.g., the worksite profile may send a text message to each individual team member when the team member is selected for the specific industrial environment and/or project).

Furthermore, in these other embodiments, the worksite profile may be communicatively coupled to the alert profile, the danger zone profile, and/or the project profile of the GAP system, such that the worksite profile may be configured to allow each selected individual team member view the project profile and/or alert profile associated with the selected industrial environment and/or project, allowing each selected individual team member to view and/or research the hazard and/or work (e.g., fixing broken pipe, commencing transport of goods, and/or disposing support beams within appropriate holes for a bridge) associated with the selected industrial environment and/or project.

Additionally, in these other embodiments, the worksite profile may be configured to input at least one task (e.g., performing maintenance and/or inspections on at least one vehicle and/or at least one equipment, performing maintenance and/or inspections on transportable goods, and/or completing assigned work of individual worker) associated with the at least one industrial environment and/or project. For example, in some embodiments, when the at least one team member assigned to the selected industrial environment and/or project is within a predetermined perimeter of the industrial environment and/or project, the worksite profile may be configured to transmit a signal to the alert profile. As such, in these other embodiments, the alert profile may be configured to transmit a notification indicative of a reminder of the tasks (e.g., reminder to perform maintenance and/or inspection of equipment) assigned to the at least one team member associated with the industrial environment and/or project.

Accordingly, in these other embodiments, the GAP system may be configured to monitor, in real-time, the progress of the at least one task assigned to the at least one individual member, such that the at least one individual member may be configured to update and/or remove the at least one notification associated with the at least one task (e.g., remove the at least one notification associated with the at least one task when the at least one individual has completed the at least one task), via the user interface communicatively coupled to the at least one processor of the GAP system.

In addition, in some embodiments, the worksite profile may be configured to allow the selected individual team members and/or the at least one service provider (e.g., FDOT) associated with the selected industrial environment and/or project to update the worksite profile of the selected industrial environment and/or project, in real-time, such that each of the selected individual team members may automatically receive up-to-date information associated with the overall progress of the project, any hazard associated with the industrial environment and/or project, any required documentation requests, and/or any additional information or inputs provided by the at least one service provider.

As such, in some embodiments, the worksite profile of the GAP system may be communicatively coupled to the at least one server of the at least one service provider and/or organization assigned to the industrial environment and/or project, such that a user may request and/or provide information/documentation associated with the selected industrial environment and/or project whether the at least one user is at the site of the industrial environment and/or project or if they are in a corporate office, or any other location associated with the industrial environment, project, and/or organization.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Kim, Eunjin, et al. "COMMUNICATION DEVICE, CONTROL METHOD THEREOF AND COMMUNICATION SYSTEM INCLUDING THE SAME", U.S. Pat. Pub. No. 2020/0168080 A1, United States Patent and Trademark Office, 28 May 2020.

Ready-Campbell, Noah Austen, et al. "OBSTACLE DETECTION AND MANIPULATION BY A VEHICLE WITHIN A DIG SITE". U.S. Pat. Pub. No 2020/0409377 A1, United States Patent and Trademark Office, 31 Dec. 2020.

Hayward, Gregory. "BROADCASTING INFORMATION RELATED TO HAZARDS IMPACTING VEHICLE TRAVEL". U.S. Pat. No. 10,055,985 B1, United States Patent and Trademark Office, 21 Aug. 2018.

Foster, Scott Douglas, et al. "SYSTEMS AND METHODS FOR OPERATING AN AUTONOMOUS VEHICLE". U.S. Pat. Pub. No 2022/0348227 A1, United States Patent and Trademark Office, 3 Nov. 2022.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of optimizing real-time workplace safety monitoring within at least one industrial environment, the method comprising:
   marking, via the at least one processor of a computing device, at least one of a plurality of geofences of at least one hazard within the at least one industrial environment;
   determining, via a GPS communication system communicatively coupled to the at least one processor of the computing device, a location of the computing device;
   comparing, via the GPS communication system communicatively coupled to the at least one processor of the computing device, the location of the at least one boundary of the at least one hazard and the at least one computing device;
   automatically facilitating, via the at least one processor of the computing device, hazard avoidance by:
      based on a determination that at least one portion of the at least one boundary of the at least one hazard and at least one portion of the computing device intersect, transmitting a notification indicative of the intersection, inhibiting access to at least one of a plurality of applications of the computing device until the location of the computing device does not intersect with any portion of the at least one geofence of the hazard, or both; and
      based on a determination that at least one portion of the at least one boundary of the at least one hazard and at least one portion of the computing device do not intersect, maintaining standard operation of the computing device;
   generating, via the at least one processor of the computing device, a danger zone profile, wherein the danger zone profile comprises a plurality of details associated with the at least one marked hazard within the at least one industrial environment; and
   wherein the plurality of details associated with the at least one marked hazard is selected from a group consisting of, an address, location, or both of the at least one marked hazard, industrial environment, or both, an asset type, the at least one geofence associated with the at least one marked hazard, a corporate department associated with the at least one industrial environment, a date of the marked hazard, a model of the asset type, an elevation of the at least one industrial environment, a level of risk associated with the at least one marked hazard, a weather condition, a plurality of photos, any required documentation associated with the at least one marked hazard, industrial environment, or both, and a combination of thereof.

2. The method of claim 1, further comprising the step of, recording, via the at least one processor of the computing device, the at least one marked hazard in a memory of the computing device and/or at least one external server of at least one service provider.

3. The method of claim 2, wherein the step of automatically facilitating hazard avoidance further comprises the step of, based on a determination that at least one portion of the at least one boundary of the at least one hazard and at least one portion of the computing device intersect, directing, via the processor of the at least one computing device, to an emergency alert page of at least one service provider.

4. The method of claim 3, wherein the emergency alert page comprises a plurality of real-time notifications.

5. The method of claim 4, wherein the plurality of real-time notifications are selected form a group consisting of a status update of the risk level associated with the at least one hazard, a real-time timeline associated with the at least one hazard, a timestamp for a removal of the at least one hazard, an all-clear status associated with the at least one hazard, and a combination of thereof.

6. The method of claim 3, further comprising the step of, mapping, via a Map profile communicatively coupled to the at least one processor of the computing device, a real-time geographical location of the at least one hazard within the at least one industrial environment on a display device associated with the computing device.

7. The method of claim 6, wherein the step of mapping a real-time geographical location of the at least one hazard within the at least one industrial environment further comprises the step of, mapping, via the GPS communication system communicatively coupled to the at least one processor of the computing device, a geographical location of the computing device on the display device associated with the computing device.

8. The method of claim 7, wherein the step of, mapping, via the GPS communication system communicatively coupled to the at least one processor of the computing device, a geographical location of the computing device further comprises the step of, outputting, via the at least one processor of the computing device, a plurality of notifications indicative of a physical distance between the computing device and at least one of the plurality of geofences on the display device associated with the computing device.

9. The method of claim 8, wherein the step of, outputting a plurality of notifications indicative of a physical distance between the computing device and at least one of the plurality of geofences on the display device associated with the computing device further comprises the step of adjusting, via the processor of the computing device, an electric current supplied to the a haptic motor associated with the computing device in response to changes in the physical distance between the real-time geographical location of the at least one hazard and the real-time geographical location of the computing device.

10. A workplace safety optimization system, the workplace safety optimization system comprising:
- a computing device comprising at least one processor; and
- a non-transitory computer-readable medium operably coupled to the at least one processor, the computer-readable medium having computer-readable instructions stored therein that, when executed by the at least one processor, cause the workplace safety optimization system to automatically facilitate hazard avoidance by executing instructions comprising:
  - marking, via the at least one processor of the computing device, at least one of a plurality of geofences of at least one hazard within at least one industrial environment;
  - determining, via a GPS communication system communicatively coupled to the at least one processor of the computing device, a location of the computing device;
  - comparing, via the GPS communication system communicatively coupled to the at least one processor of the computing device, the location of at least one boundary of the at least one hazard and the at least one computing device; and
  - automatically facilitating, via the at least one processor of the computing device, hazard avoidance by:
    - based on a determination that at least one portion of the at least one boundary of the at least one hazard and at least one portion of the computing device intersect, transmitting a notification indicative of the intersection, inhibiting access to at least one of a plurality of applications of the computing device until the location of the computing device does not intersect with any portion of the at least one geofence of the hazard, or both; and
    - based on a determination that at least one portion of the at least one boundary of the at least one hazard and at least one portion of the computing device do not intersect, maintaining standard operation of the computing device;
  - generating, via the at least one processor of the computing device, a danger zone profile, wherein the danger zone profile comprises a plurality of details associated with the at least one recorded marked hazard within the at least one industrial environment; and
  - wherein the plurality of details associated with the at least one marked hazard is selected from a group consisting of, an address, location, or both of the at least one marked hazard, industrial environment, or both, an asset type, the at least one geofence associated with the at least one marked hazard, a corporate department associated with the at least one industrial environment, a date of the marked hazard, a model of the asset type, an elevation of the at least one industrial environment, a level of risk associated with the at least one marked hazard, a weather condition, a plurality of photos, any required documentation associated with the at least one marked hazard, industrial environment, or both, and a combination of thereof.

11. The system of claim 10, wherein the executed instructions further comprise the step of, recording, via the at least one processor of the computing device, the at least one marked hazard in a memory of the computing device and/or at least one external server of at least one service provider.

12. The system of claim 11, wherein the step of automatically facilitating hazard avoidance of the executed instructions further comprises the step of, based on a determination that at least one portion of the at least one boundary of the at least one hazard and at least one portion of the computing device intersect, directing, via the processor of the at least one computing device, to an emergency alert page of at least one service provider.

13. The system of claim 12, wherein the emergency alert page comprises a plurality of real-time notifications.

14. The system of claim 13, wherein the plurality of real-time notifications are selected form a group consisting of a status update of the risk level associated with the at least one hazard, a real-time timeline associated with the at least one hazard, a timestamp for a removal of the at least one hazard, an all-clear status associated with the at least one hazard, and a combination of thereof.

15. The system of claim 12, wherein the executed instructions further comprise the step of, mapping, via a Map profile communicatively coupled to the at least one processor of the computing device, a real-time geographical location of the at least one hazard within the at least one industrial environment on a display device associated with the computing device.

16. The system of claim 15, wherein the step of mapping a real-time geographical location of the at least one hazard within the at least one industrial environment of the executed instructions further comprises the step of, mapping, via the GPS communication system communicatively coupled to the at least one processor of the computing device, a geographical location of the computing device on the display device associated with the computing device.

\* \* \* \* \*